(12) United States Patent
Fukuda et al.

(10) Patent No.: US 6,762,216 B2
(45) Date of Patent: Jul. 13, 2004

(54) PRINTING INK COMPOSITION

(75) Inventors: Kouichi Fukuda, Saitama (JP); Takeshi Shiraishi, Gunma (JP); Tomohiro Matsuki, Fukuoka (JP); Hideo Ishii, Saitama (JP); Toshihiko Hori, Tokyo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 113 days.

(21) Appl. No.: 09/969,757

(22) Filed: Oct. 4, 2001

(65) Prior Publication Data

US 2003/0069328 A1 Apr. 10, 2003

(51) Int. Cl.$^7$ .................. C09D 11/10; C08L 93/04; C08L 61/14
(52) U.S. Cl. ................. 523/160; 524/541; 524/594; 524/798
(58) Field of Search ................. 523/160, 161; 106/31.57, 31.85; 524/508, 541, 594, 798, 540, 611

(56) References Cited

U.S. PATENT DOCUMENTS

| | | | | |
|---|---|---|---|---|
| 4,253,397 A | * | 3/1981 | Emmons et al. | 101/450.1 |
| 5,319,052 A | * | 6/1994 | Prantl et al. | 524/474 |
| 5,981,625 A | * | 11/1999 | Zou et al. | 523/161 |

FOREIGN PATENT DOCUMENTS

| | | | |
|---|---|---|---|
| DE | 196 53 829 | | 6/1998 |
| EP | 1113030 A1 | | 7/2001 |
| JP | 62-265376 | | 11/1987 |
| JP | 01-306482 | | 12/1989 |
| JP | 5171089 | | 7/1993 |
| JP | 6080919 A | | 3/1994 |
| JP | 10183045 A | * | 7/1998 |
| SE | 448211 A | | 12/1974 |

OTHER PUBLICATIONS

English Translation of JP01306482 (1989).*
English Translation of JP 06016986 (1994).*
English Translation of JP 10183045 (1998).*
English Translation of DE19653829 (1998).*
Chemical Abstract XP–02189140 corresponding to Korean Patent Application 9 615 979 dated Nov. 25, 1996.
Chemical Abstract XP–002189141 corresponding to Japanese Patent Publication No. 6–016986 dated Jan. 25, 1994.
Chemical Abstract XP–002189142 corresponding to Japanese Patent Publication No. 63–277287 dated Nov. 15, 1998.

* cited by examiner

*Primary Examiner*—Callie Shosho
(74) *Attorney, Agent, or Firm*—Armstrong, Kratz, Quintos, Hanson & Brooks, LLP

(57) ABSTRACT

A printing ink composition comprising: a vegetable oil; and a rosin-modified phenol resin having a weight average molecular weight of at least 30,000, the rosin-modified phenol resin being dissolved in the vegetable oil, wherein the printing ink composition has a content of a volatile organic solvent of not more than 3% by weight.

4 Claims, No Drawings

PRINTING INK COMPOSITION

FIELD OF THE INVENTION

The present invention relates to an environmental harmonizing-type printing ink composition containing a vegetable oil as a main component for dissolving a resin for ink, and having a reduced content of a volatile organic solvent.

BACKGROUND OF THE INVENTION

Setting and drying of printing inks are carried out by the permeation of a volatile organic solvent into a base material and the oxidative polymerization of a drying oil or resin having an unsaturated bond contained in the printing ink. The permeation drying and oxidative polymerization drying-type printing inks are required to be set in a short time so that when printed matters are superposed, the ink of the printed surface of the lower printed matter does not attaches to the upper printed matter, and further are required to have a good workability so that after drying by the oxidative polymerization, the formed printed ink layer is not injured even when the printed matter is processed. Accordingly, with regard to the setting property and the drying property on a printed matter, quickness to some extent is necessary.

Hitherto, as the vegetable oil, a linseed oil, a tung oil, a soybean oil, etc., have been used. Conventionally, sufficient setting property and drying speed have been attained by the balance of the oxidative polymerization of these vegetable oils and the permeation of a volatile organic solvent. However, there have become problems that the volatile organic solvents deteriorate the environment of the printing site and further they gives bad influences on the environment of the earth. Accordingly, a printing ink in which the content of a volatile organic solvent is reduced as much as possible has been demanded.

Among conventionally known inks, there has been proposed a printing ink, for printing on a material having a permeability such as paper, which ink uses a soybean oil as a vegetable oil and in which a volatile organic solvent component is also replaced by a vegetable oil. However, a sufficient setting property has not yet been attained. Under such a circumstance, the use of a printing ink has been limited to uses with reduced productivity and workability caused by securing a setting time of the ink as much as possible with a reduced printing speed and by frequently taking out printed matters from a printing machine to prevent a large quantity of the printing matters from being superposed. Thus, inks, which are to be practically used for printing on paper, have been forced to use a volatile organic solvent together with a vegetable oil for attaining a sufficient setting speed.

SUMMARY OF THE INVENTION

An object of the present invention is to provide an environmental-meeting type printing ink composition containing a vegetable oil as a main component for dissolving a resin for ink, and having a reduced content of a volatile organic solvent as much as possible.

Another object of the present invention is to provide a printing ink composition suitable for a paper printing requiring a high-speed setting property.

Other objects and effects of the present invention will become apparent from the following description.

As the result of extensive investigations for solving the above-described problems, the present inventors found that a printing ink composition obtained by dissolving a rosin-modified phenol resin in a vegetable oil solves the problems. The present invention has been completed based on this finding.

That is, the above-described objects of the present invention have been achieved by providing a printing ink composition comprising:

a vegetable oil; and a rosin-modified phenol resin having a weight average molecular weight of at least 30,000, said rosin-modified phenol resin being dissolved in said vegetable oil, wherein the printing ink composition has a content of a volatile organic solvent of not more than 3% by weight.

Having the constitution as described above, the present invention makes it possible to provide a printing ink composition suitable for paper printing, which is an environmental-meeting type as having a reduced content of a volatile organic solvent and which has excellent setting property.

DETAILED DESCRIPTION OF THE INVENTION

The printing ink composition contains a rosin-modified phenol resin having a weight average molecular weight of at least 30,000 and a vegetable oil, the rosin-modified phenol resin being dissolved in the vegetable oil, and the content of a volatile organic solvent being not more than 3% by weight. The printing ink composition is suitable for paper printing, which is dried by a permeation drying and oxidative polymerization mechanism, and has excellent setting property.

The term of "setting of ink" means the state that by the permeation of the solvent components in the ink into a permeable base material such as paper, etc., the viscosity of vehicle components is increased to increase the fixing force of the ink onto the paper, and even at the stages before drying with the oxidative polymerization of the vegetable oil having an unsaturated bond, ink is not transferred to the back surface of paper in contact therewith by superposing printed matters.

The high-speed setting property relates to the time required for setting a printing ink printed on a specific paper, and is defined to be the value determined by the following method.

Step 1

On a two-split rubber roller of a test printing apparatus (RI tester) described in the annex 3 of JIS K 5701-1 (5.3.2) is uniformly printed 0.125 cc of a test ink, and the printed ink is transferred onto one of the following blank paper, (1) "OK Kanefuji N Duodecimo/110 kg" manufactured by Oji Paper Co., Ltd., (2) "Tokubishi Art Double Faced Duodecimo/110 kg" manufactured by Mitsubishi Paper Mills Ltd., (3) "OK Kanefuji single faced Duodecimo/110 kg" manufactured by Oji Paper Co., Ltd., and (4) "OK Top Coat N Duodecimo/110 kg" manufactured by Oji Paper Co., Ltd., including the standard blank paper "Japan Paper" of Japan Color of the ISO standard.

Step 2

The ink printed on each paper is measured in terms of the setting property defined by JIS K 5701-1 (6.2.1). The high-speed setting property is defined that the measured setting time should be not longer than 15 minutes.

The printing ink composition of the invention is produced by adding a pigment, an additional vegetable oil, and, if necessary, additives to a varnish for ink prepared by dissolving a rosin-modified phenol resin in a vegetable oil.

As the rosin-modified phenol resin, which is used for the printing ink composition of the invention, various rosin-modified phenol resins each having a weight average molecule weight of at least 30,000 can be used. The preferred weight average molecular weight range is from about 30,000 to 150,000.

The content of the rosin-modified phenol resin in the printing ink composition of the invention is from 20 to 40% by weight. The content thereof is more preferably from 25 to 30% by weight.

As the rosin-modified phenol resin, a petroleum resin-modified rosin-modified phenol resin modified by a petroleum resin can be also used. In the case of modifying with a petroleum resin, the weight ratio of the rosin-modified phenol resin and the petroleum resin is preferably from 95/5 to 85/15. The use of the petroleum resin-modified rosin-modified phenol resin in combination with the rosin-modified phenol resin contributes to an improvement of the gloss of the printed matters, and the proportion of the petroleum resin-modified rosin-modified phenol resin in the whole rosin-modified phenol resins is preferably not higher than 50%.

For the measurement of the weight average molecular weight, the following instruments and conditions apply.

GPC Apparatus: Manufactured by TOSOH CORPORATION (NO.: SC-8020)
Column: SUPER H4000
Solvent: THF
Standard material: Polystyrene
Sample concentration: 0.1 to 0.5%

In the printing ink composition of the invention, a petroleum resin can be used in combination with the rosin-modified phenol resin. The blending amount thereof in the printing ink composition is preferably from 5 to 10% by weight. The petroleum resin can contribute to an improvement of the gloss of the printed matters.

Examples of the vegetable oil, which is used for the printing ink composition of the invention, include natural oils such as a soybean oil, a linseed oil, a tung oil, a castor oil, a dehydrated castor oil, a corn oil, a safflower oil, a canol oil, etc.; and synthetic oils. Also, in the invention, these vegetable oils may be used singly or as a combination of two or more kinds thereof.

The content of the vegetable oil in the printing ink composition of the invention is preferably from 40 to 70% by weight, and more preferably from 50 to 60% by weight.

Among the above-described vegetable oils, a linseed oil and a soybean oil are preferably used for their greater effects of improving the drying property.

In the printing ink composition of the invention, a fatty acid ester derived from a vegetable oil can be also used in combination with the above-described vegetable oil. Examples of the fatty acid ester derived from a vegetable oil include a linseed oil fatty acid methyl ester, a linseed oil fatty acid ethyl ester, a linseed oil fatty acid propyl ester, a linseed oil fatty acid butyl ester, a soybean oil fatty acid methyl ester, a soybean oil fatty acid ethyl ester, a soybean oil fatty acid propyl ester, a soybean oil fatty acid butyl ester, a palm oil fatty acid methyl ester, a palm oil fatty acid ethyl ester, a palm oil fatty acid propyl ester, a palm oil fatty acid butyl ester, a castor oil fatty acid methyl ester, a castor oil fatty acid ethyl ester, a castor oil fatty acid propyl ester, and a castor oil fatty acid butyl ester.

Among the above-enumerated fatty acid esters derived from vegetable oils, the soybean oil fatty acid methyl ester, the soybean oil fatty acid butyl ester, etc., are preferably used.

The content of the fatty acid ester derived from a vegetable oil in the printing ink composition of the invention is preferably from 5 to 20% by weight in the printing ink composition, for improving the setting property. In the case of using the fatty acid ester derived from a vegetable oil in combination with the above-described vegetable oil, the contents of the vegetable oil and of the fatty acid ester derived from a vegetable oil in the printing ink composition are preferably from 35 to 50% by weight and from 5 to 20% by weight, respectively, for improving the setting property.

The printing ink composition of the invention has a feature that the content of a volatile organic solvent is not more than 3% by weight. The volatile organic solvent is not intentionally added, and the volatile organic solvent as referred to in the present invention represents those originated in auxiliaries used as needed such as a wax, a drier (a drying accelerator), a chelating agent, etc., and possibly contained in the finally obtained printing ink composition in the case where the auxiliaries used contain volatile organic solvent. It is more preferred to use auxiliaries containing no volatile organic solvent, but it is considered that the content of the volatile organic solvent of not larger than about 3% by weight is within a permissible range.

The printing ink composition of the invention may, if necessary, contain various additives for printing ink, such as a wax, a drier, a chelating agent, etc., as described above, but the additives having a less content of a volatile organic solvent are preferred. Examples of the wax include a polyethylene wax, a PTFE wax, and a sasol wax. Examples of the drier include metal soaps which are the salts of metals such as cobalt, manganese, lead, zinc, iron, calcium, cerium, rare earth metals, etc., and carboxylic acids such as octylic acid, naphthenic acid, neodecanoic acid, tung oil acid, linseed oil acid, resin acid, etc.; and the borates of the above-described metals. The chelating agent is generally called aluminum chelate, and examples thereof include the derivatives of aluminum n-butoxide, aluminum iso-butoxide, or aluminum sec-butoxide, of which one of the n-butoxy group, iso-butoxy group, or sec-butoxy group is replaced with ethyl acetate or methyl acetate.

The production of the varnish in the production of the printing ink composition of the invention can be carried out by a known method. Specifically, for example, the varnish can be produced by charging, into a flask, from 50 to 60 parts by weight of a soybean oil as a vegetable oil, from 35 to 45 parts by weight of a rosin-modified phenol resin as a resin component, and further, as needed, from 0.5 to 2 parts by weight of a chelating agent in this order, raising the temperature, and subjecting the resulting mixture to cooking conditions of 200° C. for one hour.

The printing ink composition of the invention can be produced by a method similarly to those conventionally employed. For example, the printing ink composition can be produced by adding a pigment such as an organic pigment or an inorganic pigment, a wax component, an additional varnish component, an additional vegetable oil, and a drying accelerator such as a metal soap to the varnish prepared beforehand by the processes described above, and kneading the mixture by a three-roll mill, etc.

Also in the case of producing the printing ink composition of the invention containing the fatty acid ester derived from a vegetable oil, a conventionally employed method can be used. For example, the varnish is prepared beforehand by heating a mixture of the resin for the printing ink, the fatty acid ester derived from a vegetable oil, and a part of the vegetable oil, and then a mixture of a known pigment such as an organic pigment or an inorganic pigment, the varnish thus prepared, the remaining vegetable oil, and a drying accelerator such as a metal soap is kneaded by a three-roll mill, to thereby produce the printing ink composition. The fatty acid ester derived from a vegetable oil may be added thereto after kneading, but it is preferred that the fatty acid ester is previously incorporated in the varnish.

EXAMPLES

The present invention will be illustrated in greater detail with reference to the following Examples, but the invention should not be construed as being limited thereto.

Varnish Preparation Example A

Varnish (A) was prepared by heating a mixture of 38 parts by weight of a rosin-modified phenol resin, Beckasite F-7301 (weight average molecular weight of 30,000, manufactured by DAINIPPON INK & CHEMICALS, INC.), 62 parts by weight of a soybean salad oil (manufactured by THE NISSHIN OIL MILLS, LTD.), and 0.3 part by weight of an aluminum chelate, Alumichelate (Manufactured by Hope Seiyaku K.K.), at 210° C. for one hour.

Varnish Preparation Example B

Varnish (B) was prepared by heating a mixture of 40 parts by weight of a rosin-modified phenol resin, Beckasite F-8301 (weight average molecular weight of 50,000, manufactured by DAINIPPON INK & CHEMICALS, INC.), 50 parts by weight of a soybean salad oil (manufactured by THE NISSHIN OIL MILLS, LTD.), 10 parts by weight of a soybean oil fatty acid methyl ester, TOENOL #3120 (manufactured by Toei Chemical K.K.), and 0.3 part by weight of an aluminum chelate, Alumichelate (Manufactured by Hope Seiyaku K.K.), at 210° C. for one hour.

Varnish Preparation Example C

Varnish (C) was prepared by heating a mixture of 29 parts by weight of a rosin-modified phenol resin, Beckasite F-8301 (weight average molecular weight of 50,000, manufactured by DAINIPPON INK & CHEMICALS, INC.), 61 parts by weight of a soybean salad oil (manufactured by THE NISSHIN OIL MILLS, LTD.), 10 parts by weight a petroleum resin, Pet Coal 140SE (manufactured by TOSOH CORPORATION), and 0.3 part by weight of an aluminum chelate, Alumichelate (Manufactured by Hope Seiyaku K.K.), at 200° C. for one hour.

Varnish Preparation Example D

Varnish (D) was prepared by heating a mixture of 29 parts by weight of a rosin-modified phenol resin, Beckasite F-8301 (weight average molecular weight of 50,000, manufactured by DAINIPPON INK & CHEMICALS, INC.), 61 parts by weight of a soybean salad oil (manufactured by THE NISSHIN OIL MILLS, LTD.), 10 parts by weight of a petroleum resin-modified rosin-modified phenol resin, Beckasite F5501 (weight average molecular weight of 30,000, manufactured by DAINIPPON INK & CHEMICALS, INC.), and 0.3 part by weight of an aluminum chelate, Alumichelate (Manufactured by Hope Seiyaku K.K.), at 200° C. for one hour.

Varnish Preparation Example E

Varnish (E) was prepared by heating a mixture of 29 parts by weight of a rosin-modified phenol resin, Beckasite F-7305 (weight average molecular weight of 100,000, manufactured by DAINIPPON INK & CHEMICALS, INC.), 46 parts by weight of a soybean salad oil (manufactured by THE NISSHIN OIL MILLS, LTD.), 10 parts by weight of a petroleum resin-modified rosin-modified phenol resin, Beckasite F5501 (weight average molecular weight of 30,000, manufactured by DAINIPPON INK & CHEMICALS, INC.), 15 parts by weight of a soybean oil fatty acid methyl ester, TOENOL #3120 (manufactured by Toei Chemical K.K.), and 0.3 part by weight of an aluminum chelate, Alumichelate (Manufactured by Hope Seiyaku K.K.), at 200° C. for one hour.

Comparative Varnish Preparation Example F

Varnish (F) was prepared by heating a mixture of 40 parts by weight of a rosin-modified phenol resin, Beckasite F-181 (weight average molecular weight of 15,000, manufactured by DAINIPPON INK & CHEMICALS, INC.), 60 parts by weight of a soybean salad oil (manufactured by THE NISSHIN OIL MILLS, LTD.), and 0.3 part by weight of an aluminum chelate, Alumichelate (Manufactured by Hope Seiyaku K.K.), at 210° C. for one hour.

Comparative Varnish Preparation Example G

Varnish (G) was prepared by heating a mixture of 40 parts by weight of a rosin-modified phenol resin, Beckasite F-8301 (weight average molecular weight of 50,000, manufactured by DAINIPPON INK & CHEMICALS, INC.), 20 parts by weight of a linseed oil, 40 parts by weight of AF Solvent No. S (manufactured by NIPPON MITSUBISHI OIL CORPORATION), and 0.3 part by weight of an aluminum chelate, Alumichelate (Manufactured by Hope Seiyaku K.K.) at 210° C. for one hour.

For the measurement of the weight average molecular weight, the following instruments and conditions were used.

GPC Apparatus: Manufactured by TOSOH CORPORATION (Article No.: SC-8020)

Using column: SUPER H4000

Using solvent: THF

Standard material: Polystyrene

Sample concentration: 0.1 to 0.5%

Example 1

Preparation of Ink 1

Ink 1 was prepared by kneading a mixture of 65.5% by weight of the varnish (A) described above, 16% by weight of a phthalocyanine blue, Fast Gen Blue TGR-L (manufactured by DAINIPPON INK & CHEMICALS, INC.) as a pigment, 17% by weight of a soybean oil, and 1.5% by weight of auxiliaries such as a drier, etc., by a three-roll mill.

Example 2

Preparation of Ink 2

Ink 2 was prepared by kneading a mixture of 65.5% by weight of the varnish (B) described above, 16% by weight of a phthalocyanine blue, Fast Gen Blue TGR-L (manufactured by DAINIPPON INK & CHEMICALS, INC.) as a pigment, 12% by weight of a soybean oil, 5% by weight of a soybean oil fatty acid methyl ester, and 1.5% by weight of auxiliaries such as a drier, etc., by a three-roll mill.

Example 3

Preparation of Ink 3

Ink 3 was prepared by kneading a mixture of 65.5% by weight of the varnish (C) described above, 16% by weight of a phthalocyanine blue, Fast Gen Blue TGR-L (manufactured by DAINIPPON INK & CHEMICALS, INC.) as a pigment, 17% by weight of a soybean oil, and 1.5% by weight of auxiliaries such as a drier, etc., by a three-roll mill.

Example 4
Preparation of Ink 4

Ink 4 was prepared by kneading a mixture of 65.5% by weight of the varnish (D) described above, 16% by weight of a phthalocyanine blue, Fast Gen Blue TGR-L (manufactured by DAINIPPON INK & CHEMICALS, INC.) as a pigment, 17% by weight of a soybean oil, and 1.5% by weight of auxiliaries such as a drier, etc., by a three-roll mill.

Example 5
Preparation of Ink 5

Ink 5 was prepared by kneading a mixture of 65.5% by weight of the varnish (E) described above, 16% by weight of a phthalocyanine blue, Fast Gen Blue TGR-L (manufactured by DAINIPPON INK & CHEMICALS, INC.) as a pigment, 12% by weight of a soybean oil, 5% by weight of a soybean oil fatty acid methyl ester, and 1.5% by weight of auxiliaries such as a drier, etc., by a three-roll mill.

Comparative Example 1
Preparation of Comparative Ink 1

Comparative ink 1 was prepared by kneading a mixture of 65.5% by weight of the varnish (F) described above, 16% by weight of a phthalocyanine blue, Fast Gen Blue TGR-L (manufactured by DAINIPPON INK & CHEMICALS, INC.) as a pigment, 12% by weight of a soybean oil, 5% by weight of a soybean oil fatty acid methyl ester, and 1.5% by weight of auxiliaries such as a drier, etc., by a three-roll mill.

Comparative Example 2
Preparation of Comparative Ink 2

Comparative ink 2 was prepared by kneading a mixture of 65.5% by weight of the varnish (G) described above, 16% by weight of a phthalocyanine blue, Fast Gen Blue TGR-L (manufactured by DAINIPPON INK & CHEMICALS, INC.) as a pigment, 17% by weight of a light oil, and 1.5% by weight of auxiliaries such as a drier, etc., by a three-roll mill.

Evaluation

The ink compositions thus prepared were evaluated in terms of setting property and gloss in the manner as shown below.

Setting Property

Operation: As described above

Test machine: Automatic Ink Setting Test Machine (manufactured by Toyo Seiki Seisakusho K.K.)

Paper: "OK Kanefuji N Duodecimo/110 kg" manufactured by Oji Paper Co., Ltd.

Gloss

On a two-split rubber roller of a test printing apparatus (RI tester) described in the annex 3 of JIS K 5701-1 (5.3.2) was uniformly printed 0.125 cc of a test ink, and the printed ink was transferred onto "OK Kanefuji N Duodecimo/110 kg" manufactured by Oji Paper Co., Ltd. The ink layer thus formed was measured by LAB-GLOSS manufactured by Macbeth Corporation, with an incident angle of 60° and a reflection angle of 60°.

The evaluation results obtained are shown in Table 1 below.

TABLE 1

| Ink Nos. | Setting Property (minute) | Gloss |
|---|---|---|
| Ink 1 | 8 | 58 |
| Ink 2 | 6 | 59 |
| Ink 3 | 8 | 62 |
| Ink 4 | 9 | 60 |
| Ink 5 | 6 | 60 |
| Comparative Ink 1 | 25 | 63 |
| Comparative Ink 2 | 6 | 60 |

Using each of the ink compositions for lithographic printing obtained in Examples 1 (Ink 1) and 2 (Ink 2) and Comparative Example 2 (Comparative Ink 2), printing tests were carried out with a Roland R-704 offset printing machine at a printing speed of 10,000 sheets/hour. As a result, Inks 1 and 2 each showed satisfactory printability equivalent to that of Comparative Ink 2 containing a substantial amount of volatile organic solvent, without deterioration in the ink performance as compared to Comparative Ink 2.

According to the present invention, a printing ink composition of an environmentally allowable type, which contains a vegetable oil as a main component for dissolving the resin for ink, has a reduced content of a volatile organic solvent as much as possible, and has a high-speed setting property suitable for paper printing, can be provided.

While the invention has been described in detail and with reference to specific examples thereof, it will be apparent to one skilled in the art that various changes and modifications can be made therein without departing from the spirit and scope thereof.

What is claimed is:

1. A printing ink composition comprising:
   a vegetable oil; and
   a rosin-modified phenol resin having a weight average molecular weight of at least 30,000, said rosin-modified phenol resin being dissolved in said vegetable oil,
   wherein said printing ink composition contains from 20 to 40% by weight of said rosin-modified phenol resin, from 40 to 70% by weight of said vegetable oil, and from 10 and 20% by weight of a pigment, and has a content of a volatile organic solvent of not more than 3% by weight.

2. A printing ink composition comprising:
   a vegetable oil; and
   a rosin-modified phenol resin having a weight average molecular weight of at least 30,000, said rosin-modified phenol resin being dissolved in said vegetable oil,
   wherein said printing ink composition contains from 20 to 40% by weight of said rosin-modified phenol resin, from 35 to 50% by weight of said vegetable oil, from 5 to 20% by weight of a fatty acid ester derived from a vegetable oil, and from 10 to 20% by weight of a pigment, and has a content of a volatile organic solvent of not more than 3% by weight.

3. A printing ink composition comprising:
   a vegetable oil; and
   a rosin-modified phenol resin having a weight average molecular weight of at least 30,000, said rosin-modified phenol resin being dissolved in said vegetable oil,
   wherein said printing ink composition contains from 15 to 30% by weight of said rosin-modified phenol resin, from 5 to 10% by weight of a petroleum resin, from 40 to 70% by weight of said vegetable oil, and from 10 to 20% by weight of a pigment, and has a content of a volatile organic solvent of not more than 3% by weight.

4. A printing ink composition comprising:

a vegetable oil; and a rosin-modified phenol resin having a weight average molecular weight of at least 30,000, said rosin-modified phenol resin being dissolved in said vegetable oil, wherein said printing ink composition contains from 15 to 30% by weight of said rosin-modified phenol resin, from 5 to 10% by weight of a petroleum resin, from 35 to 50% by weight of said vegetable oil, from 5 to 20% by weight of a fatty acid ester derived from a vegetable oil, and from 10 to 20% by weight of a pigment, and has a content of a volatile organic solvent of not more than 3% by weight.

* * * * *